United States Patent [19]

Owen et al.

[11] Patent Number: 4,788,881

[45] Date of Patent: Dec. 6, 1988

[54] ADJUSTMENT MECHANISM FOR A TRANSMISSION INDICATOR

[75] Inventors: Marvin L. Owen, Grand Blanc; Robert C. Swain, Davison, both of Mich.

[73] Assignee: General Motors Corporation, Detroit, Mich.

[21] Appl. No.: 164,192

[22] Filed: Mar. 4, 1988

[51] Int. Cl.⁴ ............................................. F16C 1/10
[52] U.S. Cl. .................................... 74/500.5; 116/28.1
[58] Field of Search ................... 74/501 R, 501.5 R; 116/28.1; 192/110; 188/196 R, 196 V

[56] References Cited

U.S. PATENT DOCUMENTS

| | | | |
|---|---|---|---|
| 2,913,922 | 11/1959 | Harker et al. | 74/501 R |
| 2,925,061 | 2/1960 | Thornburgh et al. | 116/28.1 |
| 3,739,741 | 6/1973 | Freyermuth | 116/28.1 |
| 3,897,747 | 8/1975 | Biazzo | 116/28.1 |
| 4,041,797 | 8/1977 | Mito | 74/501 R |
| 4,208,981 | 6/1980 | Coha et al. | 116/28.1 |
| 4,261,282 | 4/1981 | Satou et al. | 116/28.1 |
| 4,550,675 | 11/1985 | Lansinger et al. | 116/28.1 |
| 4,614,130 | 9/1986 | Heismann et al. | 74/501 R |

*Primary Examiner*—Peter A. Aschenbrenner
*Attorney, Agent, or Firm*—Donald F. Scherer

[57] ABSTRACT

An adjustment mechanism for a transmission indicator has a clip member for securement with the shift tube and a cable attachment for securement with a cable connected to the indicator which is alignable with various indicia. The cable attachment is connected with one threaded member and another threaded member is connected with the clip. Relative rotation of the threaded members causes the cable and indicator to move relative to the shift tube to permit adjustment or "zeroing" of the indicator for proper alignment with the indicia.

2 Claims, 1 Drawing Sheet

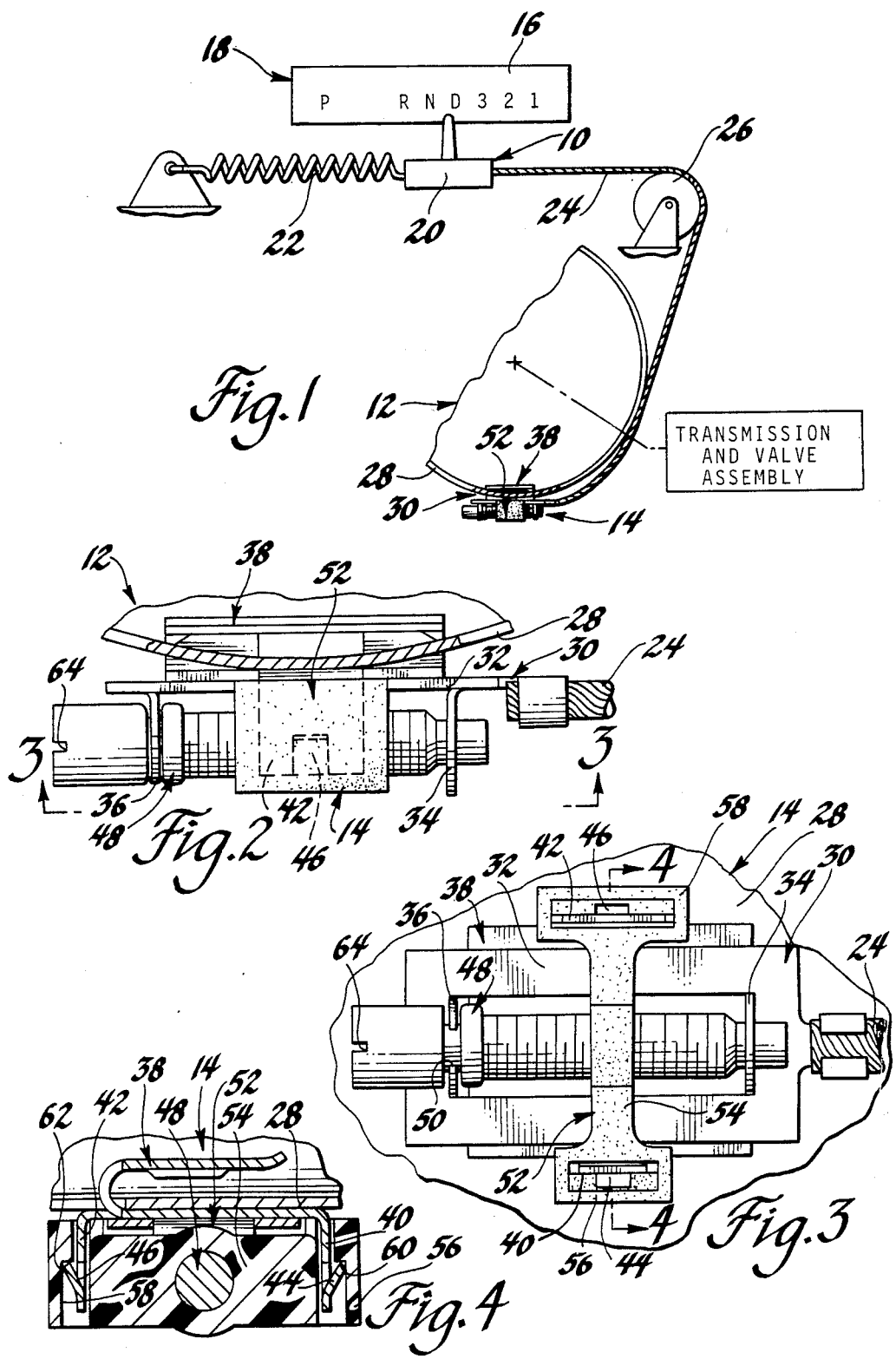

ADJUSTMENT MECHANISM FOR A TRANSMISSION INDICATOR

BACKGROUND OF THE INVENTION

This invention relates to mechanisms for aligning a transmission indicator and indicia, and more particularly to mechanisms which permit adjustment between the indicator and indicia after assembly.

As a general rule, automatic transmission indicator mechanisms are urged by spring load to move in one direction; i.e., toward Park position, and movable by a manual lever in the opposite direction against the spring force.

The indicator mechanism usually has five or more positions, such as Park, Reverse, Neutral, Drive and Low, which display to the operator the tranmission operating condition that has been selected by the operator with the manual lever. An indicator pointer is moved to align with respective indicia for each operating condition as selected when the manual lever is moved.

It is desirable to provide a mechanism which will permit alignment or "zeroing" between the pointer and indicia after assembly in the vehicle. There have been many mechanisms proposed to accomplish this function automatically. These have included friction connections and ratcheting connections between the manual lever and pointer. Both of these types of systems require a stop member or surface to be located, with a degree of accuracy, relative to one or both ends of travel of the pointer. With these mechanisms, the pointer is stopped when aligned with indicia at one end of travel, while the lost motion connection permits continued travel of the manual lever, which is connected with a transmission selector valve, until the respective transmission condition is selected. When the current operating condition in the transmission is reached, the manual lever is prevented by the transmission valve selector from further movement. At this point, the indicator and indicia are properly aligned. This alignment can only be accomplished at the extreme ends of selector travel, usually Park or Low.

There are other systems of adjustment which permit the connection between the manual lever and the indicator to be released during adjustment. These systems permit the indicator pointer to be moved by an operator independently of the manual lever until proper alignment is achieved. At this point, the operator must exert sufficient force to maintain the alignment and simultaneously reconnecting the indicator pointer and the manual lever. This generally means that the operator is required to hold the indicator pointer against the force of the return spring while tightening a threaded fastener such as a bolt. The operator must use both hands and at least one tool in a limited space adjacent the steering column to perform this function. Thus, there is a degree of difficulty in making this adjustment and the operation can be time consuming.

SUMMARY OF THE INVENTION

The present invention provides for the adjustment or "zeroing" of a transmission indicator mechanism with a simple tool, such as a screwdriver or ratchet wrench. A mechanism incorporating the present invention includes a pair of threaded members, one of which is secured to a portion of the manual shift lever structure and the other of which is connected to the indicator pointer. Rotation of one of the threaded members results in substantially linear travel of the other threaded member which is connected to the indicator pointer. The rotation of the threaded member can be quickly accomplished with a single tool.

While it is preferable to perform the adjustment at one end of travel of the indicator pointer, it is not necessary with the present invention. The alignment can be made at any of the transmission indicia. With this invention, the operator is relieved of the tedium of maintaining the indicator pointer against the spring while simultaneously securing an extension, such as a cable, of the indicator pointer to the manual shift lever mechanism.

It is therefore an object of this invention to provide an improved transmission indicator mechanism wherein the indicator pointer may be placed in alignment at assembly with the transmission indicia through the manipulation of a pair of threaded members, one of which is grounded and the other of which is connected with the indicator pointer and movable therewith such that the pointer can be aligned with the desired transmission indicia upon relative rotation between threaded members.

It is another object of this invention to provide an improved indicator alignment mechanism wherein a manually controlled indicator pointer can be "zeroed" with the transmission indicia through rotation of one of a pair of meshing threaded members, one of which is connected to the manual control and the other of which moves longitudinally relative thereto to effect movement of the indicator pointer relative to the manual control.

These and other objects and advantages of the present invention will be more readily apparent from the following specification and drawings.

DESCRIPTION OF THE DRAWINGS

FIG. 1 is a diagrammatic representation of a transmission indicator mechanism and manual control.

FIG. 2 is an enlarged elevational view of the adjustment mechanism shown in FIG. 1.

FIG. 3 is a view taken along line 3—3 of FIG. 2.

FIG. 4 is a view taken along line 4—4 of FIG. 3.

DESCRIPTION OF THE PREFERRED EMBODIMENT

Referring to the drawings, wherein like characters represent the same or corresponding parts throughout the several views, there is seen in FIG. 1 a transmission control mechanism comprised of a transmission indicator 10, a manually controlled shift mechanism 12 and an indicator adjustment mechanism 14.

The transmission indicator mechanism 10 includes an indicia plate 16 having imprinted thereon the various operating indicia, generally indicated 18, for an automatic transmission. These indicia include the operating conditions of Park "P", Reverse "R", Neutral "N", Drive "D" and "3", "2", "1", for other operating conditions and forward drive ranges. "1" indicates the lowest of the drive ranges.

The indicator mechanism 10 also has an indicator pointer assembly 20 which is selectively alignable with the various indicia 18. The indicator pointer 20 is urged in one direction toward the "P" position, by a spring member 22. A manual cable 24 is also connected to the indicator pointer 20 and is operable on manual effort to move the pointer 20 rightward from the "P" position to the other operating positions.

The cable 24 is routed over a drum or sheave 26 and secured to the adjustment mechanism 14, which in turn is connected with the manually controlled shift mechanism 12. The shift mechanism 12 may be constructed similar to the column mounted shift mechanism shown in the U.S. Pat. No. 2,925,061 to Thornburgh et al. issued Feb. 16, 1960, and assigned to the assignee of the present invention. The construction of these shift mechanisms is well known such that a more detailed description is not believed necessary for a complete understanding of the present invention. For purposes of this disclosure, it is sufficient to recognize that the mechanism 12 includes a shift tube 28 which is rotatable in response to inputs movements from an operator. From FIG. 1, it will be apparent that clockwise rotation of the shift tube 12 will result in the pointer 20 moving rightward because of the force exerted through the cable 24 while counterclockwise rotation of the shift tube 18 will result in movement of the pointer 20 leftward as a result of the force of spring 22. Thus, the pointer 20 can be manipulated and selectively positioned by the operator at the various transmission operating conditions.

The shift tube 28 is connected through linkage or cable mechanisms to a transmission selector valve assembly which is positioned remotely and not shown. The above mentioned Thornburgh et al. patent can be referred to for a diagrammatic representation of such a connection. The transmission selector valve mechanism, as is well known, is operable to establish the desired operating condition in the transmission mechanism.

So that the operator will be aware of the transmission indicia selected, it is important that the indicator 20 be aligned with the indicia which indicates the respective transmission operating conditions. Due to manufacturing tolerances, the indicator 20 will not always be properly aligned during initial assembly. Therefore, the adjustment mechanism 14 is provided to permit the assembler to effect proper alignment.

As best seen in FIGS. 2 through 4, the adjustment mechanism 14 includes a slide member 30 which is secured to the cable 24. The slide member 30 includes a base member 32 and a pair of upstanding leg members 34 and 36. The base member 32 is slidably disposed on a clip 38 which is secured in the shift tube 28. The clip 38 has a pair of upstanding attachment members 40 and 42 having respective attachment fingers 44 and 46.

A male threaded member 48 is secured in the upstanding legs 34 and 36. As best seen in FIG. 3, leg member 36 has a slot 50 formed therein which will permit the threaded member 48 to be snapped into position such that the longitudinal axis thereof will be substantially parallel to the base member 32. The male threaded member 48 is threadably engaged or meshing relation with a female threaded member 52. The threaded member 52 includes a body portion 54 and a pair of connecting arms 56 and 58. Each connecting arm 56 and 58 has a shoulder portion 60 and 62, respectively, which are positioned to cooperate with the attaching fingers 44 and 46, respectively, for securement of the threaded member 52 with the clip 38. Thus, the threaded member 52 is not movable relative to the shift tube 28.

The threaded member 48 is provided with a slot 64 which can be engaged by a straight shank type screwdriver, not shown. In the alternative, a socket type drive connection can be formed on the threaded member 48. In any event, the threaded member 48 can be rotated manually relative to the threaded member 52. Since the threaded member 52 is secured to the shift tube 28, the threaded member 48, slide member 32 and calbe 24 will be moved relative to the shift tube 28 upon rotation of the member 48. The indicator 20, as previously explained, will move to the right with the cable 24, or to the left with the spring 22, if the cable is loosened.

The indicator pointer 20 can therefore be selectively aligned manually with the indicia 18 disposed on the indicia plate 16 independently of the shift tube 28. In order to provide proper alignment, the operator selects a transmission operating condition, for example "1", through manipulation of the shift mechanism 12. If, at this time, the pointer is not properly aligned with the indicia "1", it can be moved relative thereto through manipulation of the threaded member 48 until proper alignment is obtained.

Thus, it is evident that the present invention will permit the alignment of the indicator pointer with the transmission indicating 18, independently of the transmission mechanism, by movement of the indicator 20 relative to the manual mechanism 12. If for some reason the indicator mechanisms 10 should become misaligned during the life of the vehicle, it is a simple matter to perform the operation described above and achieve realignment.

It should be obvious from the above description that this alignment manipulation can be accomplished through the use of a simple tool and require very little of the operator's time.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An adjustment mechanism for a transmission indicator having an indicia plate, an indicator selectively alignable with indicia on said plate, a cable connected to said indicator, an operator controlled member and said adjustment mechanism connected between said cable and said operator controlled member; said adjustment mechanism comprising: clip means for securing said adjustment mechanism to said operator member in a predetermined position and including a pair of upstanding attachment means; female threaded means secured on said attachment means having a threaded opening means; slide means for securing said cable to said adjustment mechanism including a base slidably disposed between said female threaded means and said clip means and a pair of upstanding leg means disposed on opposite sides of said female threaded means and each leg means having an opening coaxial with said thread opening; and male thread means being captured but freely rotatable in said openings in said leg means and threadably engaging said threaded opening means in said female threaded means and including manual control means for permitting manual rotation of said male threaded means for causing linear motion of said base and said cable relative to said clip and said female threaded means for positioning said indicator relative to said indicia to ensure proper alignment thereof.

2. An adjustment mechanism for a transmission indicator having an indicia plate, an indicator selectively alignable with indicia on said plate, a cable connected to said indicator, an operator controlled member and said adjustment mechanism connected between said cable and said operator controlled member; said adjustment mechanism comprising: clip means for securing said adjustment mechanism to said operator member in a predetermined position and including a pair of upstanding attachment means; a pair of intermeshing threaded means one of which is secured on said attachment means; slide means for securing said cable to said adjustment mechanism including a base slidably disposed between said one threaded means and said clip means; and said other threaded means being rotatably supported on said base means; means for permitting manual rotation of one of said threaded means for causing linear motion of said base and said cable relative to said clip and said other threaded means for positioning said indicator relative to said indicia to ensure proper alignment thereof.

* * * * *